June 20, 1939.   S. L. CLOTHIER ET AL   2,163,547
TELEVISION SCANNING SYSTEM
Filed July 2, 1936   2 Sheets-Sheet 2

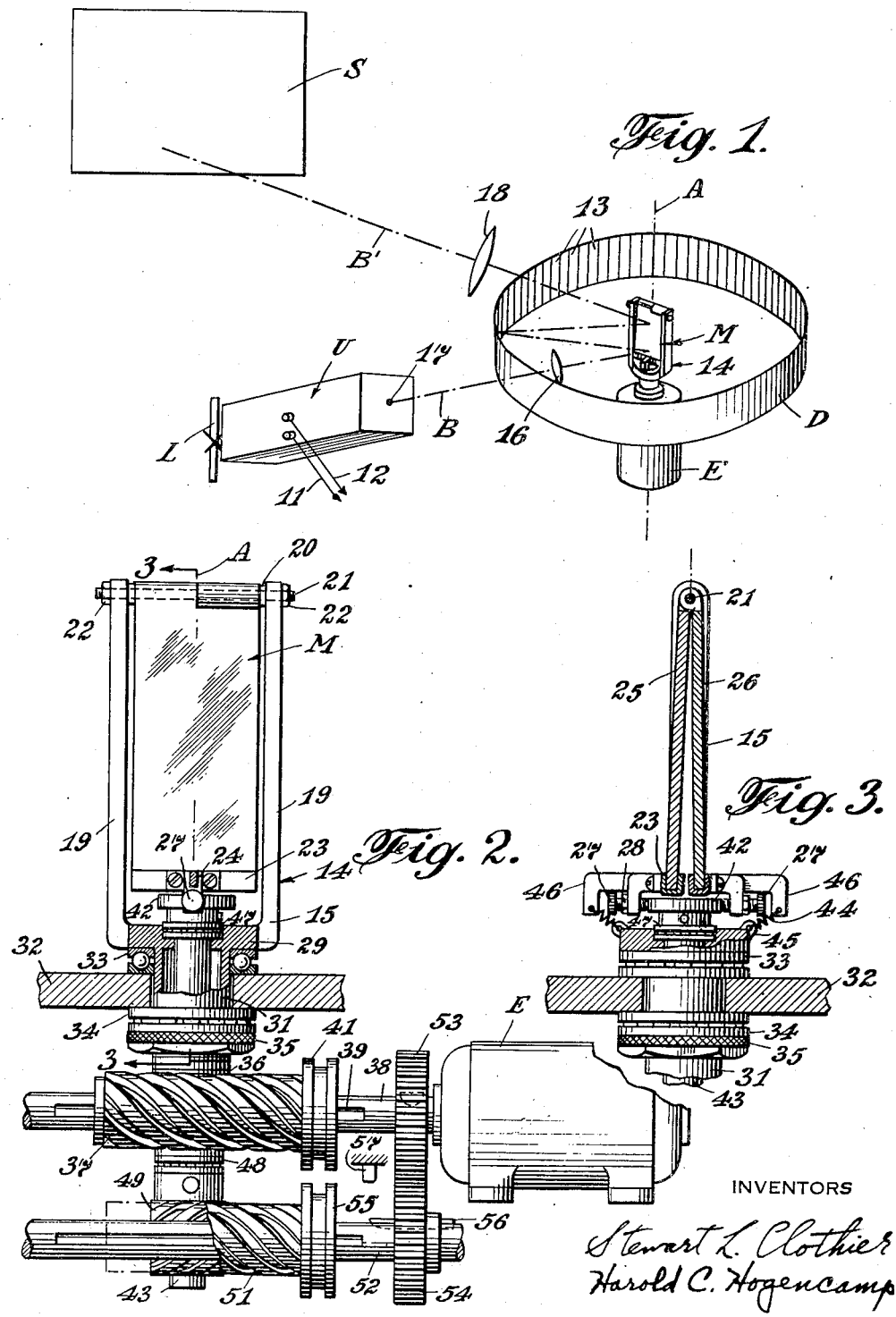

INVENTORS
Stewart L. Clothier
Harold C. Hogencamp

Patented June 20, 1939

2,163,547

UNITED STATES PATENT OFFICE 2,163,547

TELEVISION SCANNING SYSTEM

Stewart L. Clothier, Irvington, and Harold C. Hogencamp, Maplewood, N. J., assignors to Kolorama Laboratories, Inc., Newark, N. J., a corporation of New Jersey Application July 2, 1936, Serial No. 88,576

7 Claims. (Cl. 178—7.6)

This invention relates to television and more particularly to mechanical scanning methods and apparatus therefor.

In one form of mechanical scanning apparatus heretofore employed, use has been made of a stationary drum the internal periphery of which is provided with a plurality of reflecting surfaces. A rotating mirror or scanner is mounted substantially at the axis of the stationary drum in such a manner as to direct a light beam from the modulated source upon successive reflecting surfaces about the periphery of the stationary drum and so as to direct the beam reflected from the mirror surfaces upon the screen. The successive mirrors are tilted away from the axis of the drum at gradually increasing angles. This tilting, in conjunction with the angular relationship of the respective mirrors about the periphery, provides for displacement of the reflecting surfaces or elements in two planes, and causes the light beam to successively cover every portion of the screen.

This system of scanning is possessed of many disadvantages. For example, the rotatable mirror scanner which is mirrored on both sides completes one scanning operation or one complete covering of the screen during each half revolution. Accordingly the number of lines available in the scanning operation is definitely limited to the number of reflecting surfaces positioned about the inner periphery of the stationary drum. In order to increase the number of lines, it is necessary that the number of reflecting surfaces be correspondingly increased. Obviously, in order to obtain high definition and at the same time maintain light efficiency within reasonable range, it is necessary to extend the size of the drum beyond practical limits. Furthermore, in order to obtain accurate scanning, it is essential that the respective reflecting surfaces be positioned very accurately about the inner periphery of the drum not only with respect to the periphery but further that the respective reflecting elements be tilted away from the axis in definite increments. A still further disadvantage residing in such prior systems is the difficulty encountered in obtaining complete screen coverage at the corners thereof as a result of the optical inefficiency of the rotating mirror occurring when the mirror is in the position for scanning such corners.

Attempts have been made to overcome one or more of the foregoing disadvantages, for example, the single reflector which is silvered on both sides has been replaced by a prism provided with relatively numerous mirrored sides. Under these circumstances the stationary drum may be reduced to a segment of the original drum without sacrificing any degree of definition. In such installations the reflecting surfaces bounding the prism are also tilted with respect to radii drawn from the axis to each surface, entailing considerable further adjustment and consequent cost in production. In any case the number of line scans is restricted to the number of separate light beams formed during a single revolution of the centrally positioned rotatable mirrored scanner.

With the present improved television scanning apparatus all of the foregoing disadvantages have been overcome. According to the present arrangement, the mirrored surfaces or elements positioned about the inner periphery of the stationary drum may be aligned without any tilting so as to be positioned in the same angular relation with respect to the axis of the drum. It is further possible with the present arrangement to obtain high definition scanning by increasing the speed of the central rotating mirror and by increasing the number of revolutions required in the scanning of a single picture.

The principal objects of the present invention are to provide a simplified method of scanning; to provide new and improved mechanism for television scanning in the type of apparatus employing a stationary drum; to provide new and improved structure for increasing the definition obtainable with a given stationary drum; and to provide means and apparatus for scanning with the aid of a stationary drum of a type having coaxially arranged mirrors about the inner periphery, in such a manner that all portions of the screen are successively covered. These and other objects will be more readily understood from the following specification and from the drawings, in which:

Fig. 1 is a diagrammatic view representing one type of apparatus embodying applicants' invention adapted for use in conjunction with a source of modulated light and a screen;

Fig. 2 is a front elevational view partly in section of one form of rotatable mirror apparatus operating according to the present invention;

Fig. 3 is a longitudinal cross-sectional view taken on the lines 3—3 of Fig. 2;

Figure 4:
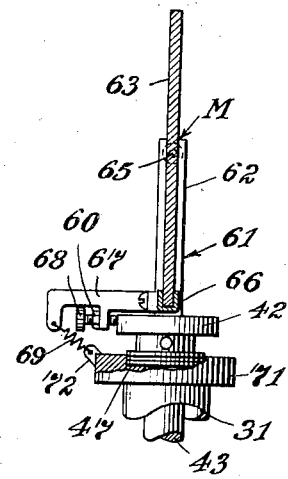
Fig. 4 is a longitudinal cross-sectional view of a modified form of construction incorporating features of the present invention.

More specifically the invention contemplates employing means for providing rotational movement of a mirrored scanner substantially at the axis of a stationary drum, the inner periphery of the drum being provided with a plurality of reflecting surfaces each of which is positioned at an identical angle with respect to the axis, and to means for oscillating the rotatable scanner about a second axis transversely positioned with respect to the axis of the drum. Preferably the rotatable scanner is oscillated by means of a cam which may either be held in a stationary position with respect to the mounting or which may be rotated with respect thereto.

Referring again to the drawings and more especially to Figs. 1, 2 and 3, one form of construction embodying features of the invention consists of a source of light L, for example, a carbon arc or an incandescent filament disposed in operative relation to a light modulating unit U. The unit U may be of any conventional design capable of acting upon a beam B from the light source L so as to modulate the beam according to a predetermined manner in response to electrical impulses received from the transmitting station. Successful results have been obtained with a conventional unit employing a pair of light polarizing elements such as Nicol prisms in conjunction with a Kerr cell, the terminals of which connect with a television receiver (not shown) through wires 11 and 12.

The unit U is positioned so that the beam B emanating therefrom is directed upon a rotatable scanner M and thence upon successive reflecting surfaces 13 about the inner periphery of the stationary drum D. Any convenient means (not shown) may be provided to support the drum D in operative relation to the rotatable scanner M and its associated mechanism, so long as the light beam B is not obstructed. The reflecting surfaces 13 are concentrically arranged about the axis A of the scanner M, each surface being disposed at an identical angle with radii drawn to the respective surfaces, and preferably parallel to the axis A. The reflecting surfaces may be of any convenient number. Satisfactory results are obtainable with forty-five reflecting elements, although this number is not intended to in any sense limit the scope of the invention. In the apparatus herein disclosed, each reflecting surface is longer than it is wide, the ratio of length to width being determined by the radius of the drum D and by the amplitude of the oscillation employed with the rotatable mirrored scanner M. The beam B from the unit U strikes the scanner M, is cast upon at least one of the surfaces 13 where it is reflected back upon the rotating scanner M from which it is projected as beam B' upon the screen S. The scanner M is provided with suitable mounting structure 14 which will be hereinafter more fully described. The structure 14 comprises briefly a yoke-shaped supporting bracket 15 suitably connected with the shaft of a motor or other suitable prime mover E, capable of rotating the scanner M at a constant predetermined speed. A projection lens 16 is interposed in the path of the beam B between the unit U and the scanner M, and co-operates with a second lens 18 positioned in the path of the beam B' between the scanner M and the screen S so as to form an image of the aperture 17 upon the screen S. The portion of the beam B extending from the scanner M to the inner periphery of the drum D and reflected therefrom back upon the scanner M rotates completely about the periphery during each half revolution of the scanner M, while the beam B' scans the surface of the screen S, but the portion of the beam B leading from the light modulating unit U to the scanner M remains stationary.

The supporting bracket 15 is provided with a pair of upwardly extending arms 19 which serve as means for mounting the scanner M for pivotal movement about an axis extending transversely of the axis of rotation A. Pivotal mounting means, as for example a rod 21, extends between the arms 19, being held in place by nuts 22, with washers 20 interposed between the scanner M and the respective arms 19. The scanner M consists of a pair of closely juxtaposed plates 25 and 26 formed of any suitable material, the outer faces of which comprise smooth planes, each of which is silvered or otherwise provided with a reflecting surface. Satisfactory results may be obtained with a mirror scanner M formed of sheet glass or of highly polished metal especially intended for reflecting purposes. The plates are apertured near the upper extremity to receive the rod 21, and are otherwise recessed to form a hinge joint.

The lower edge of each plate 25 and 26 is provided with a channel 23, preferably of sheet metal, which is rigidly secured thereto as by cement or other convenient means so as to serve as a mounting strip for an outwardly and downwardly extending bracket 24. An adjustable follower 27 consisting preferably of a hardened steel thumb screw extends inwardly through a downwardly projecting portion of each bracket 24 and is maintained in predetermined position as by a lock nut 28.

The yoke-shaped bracket 15 terminates in a base member 29 which serves to unite the two upwardly extending arms 19. A tubular shaft 31 is integrally secured to the base member 29 and extends downwardly therefrom coaxial with the axis of rotation A. The entire mounting structure 14 is rotatably mounted with respect to a supporting member 32 by means of suitable ball or roller bearings 33 and 34 which are adapted to take up the end thrust and to provide for rigid rotational mounting of the mirror with a minimum of friction and lost motion. Bearing-adjustment means 35 may be threaded upon the shaft 31. Mechanism is provided for rotating the shaft 31 and thereby the scanner M at a constant predetermined speed. This mechanism which may be of any desired construction is indicated in the drawings as a helical gear 36 secured to the shaft 31, in operative engagement with a similar gear 37 connected to the motor shaft 38. The gear 37 is splined to the shaft 38 as by a feather or key and is free for limited axial movement along the keyway 39, formed in the shaft 38. Longitudinal axial motion is imparted to the gear 37 in any convenient manner as by means of a yoke-shaped member of conventional design (not shown) in operative engagement with a throw-out collar 41 secured to the gear 37. The gear 37 is permitted to move axially with respect to the shaft 38 a distance sufficient to rotate the mirror scanner M through a portion of a revolution. The gear 37 and consequently the scanner M may thus be adjusted to any position so as to produce proper horizontal "framing" of the picture upon the screen S.

A cam 42 is provided in conjunction with the scanner M, and engages the followers 27 in order to produce an oscillatory motion of the plates 25 and 26 during rotation of the scanner M. Preferably the cam 42 comprises an eccentric disc mounted upon a shaft 43 which extends coaxially through the tubular shaft 31. Resilient means, such as a pair of springs 44, each extending between a lug 45 integrally secured to the base member 29 and an extension 46 of each bracket 24 urge the followers 27 into constant engagement with the cam 42. Accordingly as the scanner M rotates each plate thereof will be provided with a separate oscillatory motion about the transverse axis formed by the rod 21, as the followers 27 move along the eccentric surface of the cam 42.

If the cam is maintained in a stationary condition relative to the supporting member 32, at least one oscillation of the plates 25 and 26 occurs during each half revolution. However, under certain circumstances, as has been previously pointed out, it may be desirable to have the scanner M complete more than one-half revolution during the scanning of a single picture. Accordingly means is provided for rotating the cam 42, preferably in the same direction as the scanner but at a slower rate, so that during the time required for the followers 27 to travel about the periphery of the cam 42 a distance sufficient to complete a single oscillation of each plate, the scanner M has rotated more than half a revolution. An upper bearing 47 preferably of the ball or roller type is housed between the cam 42 and the base member 29 and serves to take the downwardly exerted axial thrust, and the radial thrust imparted by the springs 44 and followers 27. A similar bearing 48 is positioned near the lower end of the shaft 43 and engages the lower end of the tubular shaft 31 and the collar of a second helical gear 49. Rotary motion is imparted to the gear 49 by means of a similar gear 51 operatively connected therewith. The gear 51 is splined on a rotatably mounted counter shaft 52 normally held in operative engagement with the shaft 38 by means of spur gears 53 and 54 secured respectively to the shafts 38 and 52. A throw-out collar 55 is secured to the gear 51 to provide means for moving the gear axially with respect to its shaft. By properly positioning the gear 51 axially, the cam 42 may be adjusted so as to provide "framing" of the picture in a direction perpendicular to that provided by the adjustment of the gear 37. By properly proportioning the gears 53 and 54 as well as the gear 49, the cam 42 may be made to rotate at any predetermined speed. Obviously the cam may be connected to the motor shaft 38 in any other convenient manner, or if desired a separate motor may be used to drive the cam. In any case the rotational movement of the scanner M and its relative speed with respect to the cam 42 must correspond with the scanning speed employed at the transmitting station.

Any conventional method may be employed for holding the cam 42 in a stationary position. One method for obtaining this result is arbitrarily illustrated in the drawings as comprising a spline 56 formed in the shaft 52 and cooperating with the gear 54 so as to permit axial movement of the gear with respect to the shaft. Accordingly the gear 54 may be moved to the left when looking at Fig. 2 so as to disengage itself from the gear 53 and at the same time to contact a stationary stop or locking member 57 mounted in any convenient manner to the supporting structure.

Figure 7:
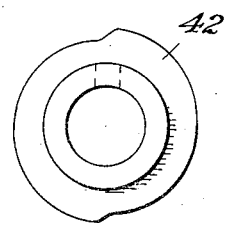

As an example of the manner in which the device operates, a cam, for instance of the shape indicated in Fig. 7, is secured to the shaft 43 in such a manner that the followers 27 engage the eccentric surface forming the periphery. With the gear 54 disengaged from the gear 53 and secured against relative movement as by the stop 57 the cam is thereby held stationary. The motor shaft 38 is then rotated at the proper constant speed and the speed ratio between the shaft 38 and the shaft 31 adjusted so as to rotate the mirror about the axis A at a speed of 720 R. P. M. The light modulating unit is properly adjusted so that the beam B falls upon the mirrored scanner M at approximately the proper angle. The gears 37 and 51 are then adjusted axially in any convenient manner so as to produce the required vertical and horizontal framing in order to properly align the image or picture upon the screen S. As the cam 42 is stationary, two complete oscillations of the mirror plates about the transverse axis are completed during each revolution and at 720 R. P. M., the picture is reproduced at the standard rate of 24 frames per second. Since the portion of the beam B directed upon the reflecting surfaces 13 makes one complete circuit of the periphery during each half revolution of the scanner M, the number of lines available in scanning the frame is equivalent to substantially the number of elements about the periphery in the event that the cam is stationary. The cam shown in Fig. 7 may be designed so as to give constant angular acceleration or variable angular acceleration, but it is preferably designed so as to provide constant angular velocity of the scanner M in one direction about the transverse axis during a major portion of each cycle, with a relatively quick return motion.

When the cam is set in motion as by engaging the gears 53 and 54 the angular velocities of the cam and the scanner about the axis A are preferably so adjusted that a differential velocity of 720 R. P. M. exists between the cam and the rotating scanner M. For example, the scanner M may be rotated by means of the motor E at a synchronous speed of 1800 R. P. M. By providing proper speed rotation, the cam 42 may be caused to turn at 1080 R. P. M., providing a speed differential of 720 R. P. M. As the number of frames scanned is determined by the speed of the mirror relative to the cam, under these latter conditions the images are still formed at the standard rate of 24 frames per second. During the time required to scan a single frame, however, the scanner M has completed more than half a revolution, as it is rotating at an increased rate of speed. Since it is rotating two and one-half times as fast at 1800 R. P. M. as it is when rotating at 720 R. P. M. the number of line scans in this latter case will be equivalent to substantially two and one-half times the number of reflecting surfaces provided about the periphery of the drum D. These figures are quoted simply to point out specific examples of operation and it is to be understood that the mirror may be rotated at other speeds to produce more or less lines, and that the relative angular velocity between the cam 42 and the scanner M may be varied so as to produce a different number of frames per second.

Figure 5:
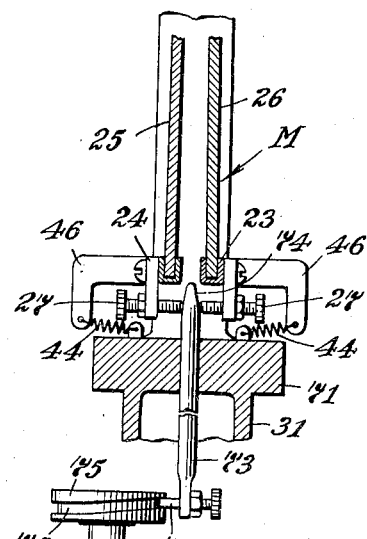
Fig. 5 is a longitudinal sectional view on an enlarged scale of a further variation of a mirror scanner-actuating mechanism.

Figs. 4 and 5 represent slightly modified forms of the invention. Since the modified structure resides principally in the mirror scanner M, only this portion of the apparatus is indicated. In Fig. 4 the rotatable mirror unit consists of a supporting structure 61 comprising two upwardly extending arms or bifurcations 62 of a form similar to those indicated in Fig. 2. A single mirror plate 63 is provided in place of the double mirror structure previously described. In this installation both outer surfaces of the plate comprise a smooth plane surface which is silvered or otherwise formed into a mirror preferably of the first surface type. The plate 63 may be pivoted at the top in any convenient manner if desired, but preferably the transverse axis 65 about which the mirror 63 oscillates is located at or near the midsection of the plate, perpendicular to and coplanar with the axis of rotation.

Any convenient means may be provided for securing the cam operated follower to the mirror plate 63. In the form of the device indicated in Fig. 4 use is made of a channel member 66 secured to the lower edge of the mirror, to which is secured a bracket 67 serving as a mounting means for a follower 68 as well as for a spring retaining means 69. The cam 42, for example that shown in either Fig. 6 or Fig. 7, may be similar to the one employed in the previously described form of the invention. A base member 71 connects arms 62 at the lower extremity and serves as a mount for the tubular shaft 31. The connection of the shaft 31 with the motor as well as the mounting means employed for the cam 42 may be identical with that already described. A lug 72 is secured to the base member 71 so as to engage the other end of the spring means 69 tending to maintain the follower 68 in constant contact with the cam 42, against centrifugal force. The follower 68 is adjustable and may be locked with a nut 69 after the plate 63 has been set in the proper relation.

The operation of the device shown in Fig. 4 is substantially identical with that previously described. The entire mirror structure is caused to rotate as a unit with respect to the mirror drum D as shown in Fig. 1 and the cam 42 may be rotated or held stationary to provide for oscillatory movement of the mirror plate 63 about the transverse axis 65 in accordance with the configuration of the cam 42.

The form of the device shown in Fig. 5 is substantially identical with that indicated in Fig. 2 with the exception of the cam operating mechanism, so that the same reference numerals will be used to designate similar parts. In Fig. 5 two mirror plates 25 and 26, having oppositely disposed mirror surfaces are pivoted at any convenient location about an axis transverse of the axis of rotation. Brackets 24 are mounted in the usual way at the base of the mirrors to support the cam followers 27 and to serve as a mounting means for the spring 44. In the present case, however, the previously employed rotatable cam 42 has been replaced by a plunger 73 extending through the center of the tubular shaft 31. The plunger is provided at its upper extremity with tapered or conical portion 74 which is adapted to engage the inner ends of the followers 27 and to thereby cause the plates 25 and 26 to oscillate about the transverse axis as the plunger is reciprocated vertically. The reciprocation of the plunger 73 may be provided in any suitable manner as for example by means of a rotatable cam 75 the outer periphery of which is provided with an annular groove 76. A follower 77 engages the groove and imparts vertical reciprocatory movement to the plunger 73 in response to the rotation of the cam 75 by a motor 78. The plunger 73 is free for relative rotary movement within the base member 71 and is not normally held in a stationary position against vertical movement. The plunger type of cam mechanism may be adapted equally well for use with a single plate mirror scanner shown in Fig. 4.

The operation of the device shown in Fig. 5 is accomplished by rotating the shaft 31 according to the manner previously described. The oscillatory movement of the mirrors producing vertical scanning of the screen S is produced by rotating the cam 75 at a convenient predetermined speed. In this latter form of the invention very little power is required to operate the cam mechanism so that the motor 78 employed for driving the cam 75 may be of extremely low power rating and may be synchronized by means of amplified impulses contained in the television carrier.

Under certain circumstances, as when the cam 42 is stationary, some difficulty may be encountered in obtaining satisfactory scanning at the corners of the screen by virtue of the fact that when scanning these portions, the mirror of the scanner M forms almost a straight angle with the beam B emanating from the unit U, and the optical reflecting efficiency is thereby impaired. This objection may be overcome by properly rotating the cam 42 so that the plates 25 and 26 may frequently be positioned more nearly perpendicular to the beam B when scanning the corners of the screen. In practice, it may be preferable in overcoming the above difficulty to regulate both the speed of the scanner and the cam so that during the time required to scan a single frame, the scanner M does not rotate through exactly 180° or any multiple thereof.

Figure 6:
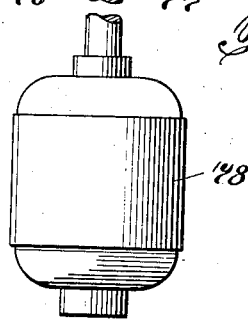
Figs. 6 and 7 illustrate typical cams which may be employed with the mirrored scanner shown in Figs. 2 and 3.

A cam of the general type illustrated in Fig. 6 may be employed, for example with the scanner shown in Figs. 2 and 3, to obtain sinusoidal scanning. Accordingly, the mirror surface of the scanner oscillates in one direction about the transverse axis during the scanning of one frame and in the opposite direction during the scanning of the successive frame. If the cam is made slightly asymmetrical with respect to a median line across the face, the cam may be employed to scan each frame twice in opposite directions so as to produce interlaced scanning.

Various modifications may be made in the apparatus herein disclosed without departing from the spirit of the invention, as we contemplate any structure properly within the scope of the appended claims.

We claim:

1. In television scanning apparatus comprising a screen, a source of modulated light, a stationary mirror drum, and a plurality of reflecting surfaces about the inner periphery of said drum, all of said surfaces being arranged in identical angular relation to the axis of said drum; a television scanning element comprising a rotatable mirror positioned so as to direct a beam of light from said source on to said reflecting surfaces and so as to direct the beam reflected from said surfaces on to said screen, means for rotating said mirror, and means for oscillating said mirror transversely of its axis of rotation.

2. In television scanning apparatus comprising a screen, a source of modulated light, a stationary mirror drum, and a plurality of reflecting surfaces about the inner periphery of said drum, all of said surfaces being arranged in identical angular relation to the axis of said drum; a television scanner comprising a rotatable scanning element mounted for rotary movement about the axis of said drum so as to direct a beam of light from said source onto successive reflecting surfaces of said drum and so as to direct the beam reflected from said surfaces onto said screen, means for rotating said scanner about the axis of said drum, and means for oscillating said scanner about an axis substantially perpendicular to its axis of rotation.

3. In television scanning apparatus comprising a screen, a source of modulated light, a stationary mirror drum, and a plurality of reflecting surfaces about the inner periphery of said drum, all of said surfaces being arranged in the same angular relation to the axis of said drum; a television scanner comprising a rotatable plane mirror mounted for rotary movement about the axis of said drum so as to direct a beam of light from said source onto successive reflecting surfaces of said drum and so as to direct the beam reflected from said surfaces onto said screen, means for rotating said scanner about the axis of said drum, and means for oscillating said plane mirror about an axis parallel to the plane of said mirror and transverse of the axis of said drum.

4. Television scanning apparatus comprising a stationary drum; a plurality of reflecting surfaces disposed about the inner periphery of said drum, each of said surfaces being disposed in a plane parallel to the axis of said drum; a movable mirrored scanner positioned for rotational movement about the axis of said drum and for oscillatory movement about a second axis transverse of the axis of said drum, and means for rotating and oscillating said mirrored scanner.

5. In television scanning apparatus in combination with a stationary drum, and a plurality of reflecting elements disposed about the inner periphery thereof, each of said elements being disposed at the same angle to the axis of said drum; a movable scanner positioned for rotary movement about the axis of said drum and comprising a pair of oppositely disposed mirrored surfaces, means for rotating said surfaces about the axis of said drum, and means for oscillating said surfaces about an axis positioned transverse of the axis of said drum.

6. Apparatus as defined in claim 5 wherein said means for oscillating said surfaces comprises a cam.

7. A television scanner comprising a support; means for rotating said support; a reflecting surface pivotally mounted on said support for rotation therewith and for oscillation on an axis transverse to the axis of rotation of said support; a tapered plunger; a follower secured to said reflecting surface and engaging said plunger; and means for reciprocating said tapered plunger during rotation of said support and reflecting surface, the engagement between the plunger and follower causing said reflecting surface to oscillate during rotation of said support.

STEWART L. CLOTHIER.
HAROLD C. HOGENCAMP.